Dec. 9, 1969
A. H. DROUIN
3,482,601
DIVERTER
Filed Sept. 12, 1966
2 Sheets-Sheet 1
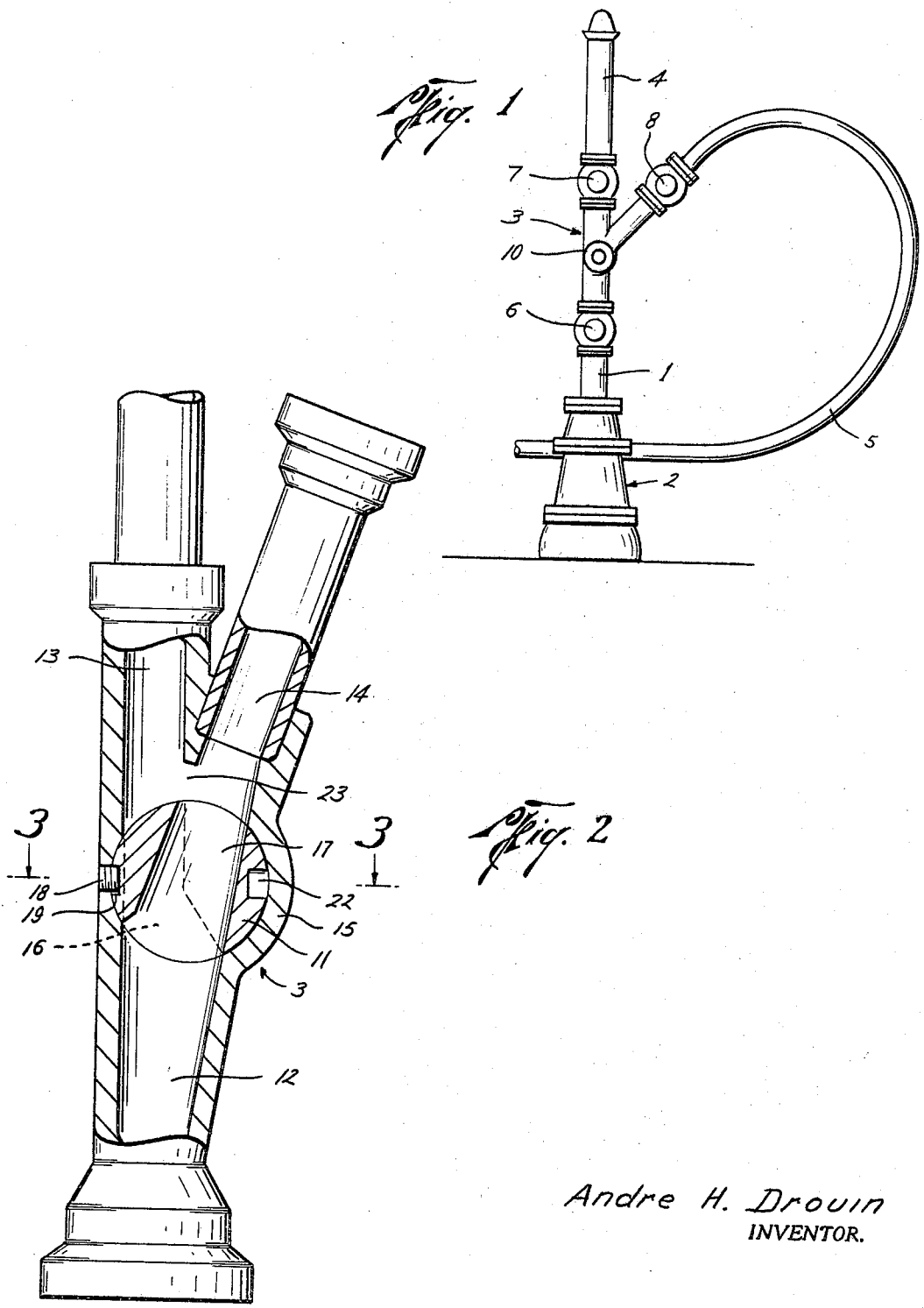
Andre H. Drouin
INVENTOR.

Andre H. Drouin
INVENTOR.

United States Patent Office 3,482,601
Patented Dec. 9, 1969

3,482,601
DIVERTER
Andre H. Drouin, Houston, Tex., assignor to Rockwell Manufacturing Company, Pittsburgh, Pa., a corporation of Pennsylvania
Filed Sept. 12, 1966, Ser. No. 578,738
Int. Cl. F16k *11/02, 31/12*
U.S. Cl. 137—610           10 Claims

ABSTRACT OF THE DISCLOSURE

A remotely operable diverter valve for installation at the intersection of a Y conduit having a main conduit and branch conduits. The valve comprises a cylindrical plug mounted for axial movement in a housing transversely to the axis of the main and branch conduits. The plug is provided with passages which are positionable to permit flow between the main conduit and one branch conduit while blocking flow through other branches. The passages have cross-sectional areas decreasing from the main conduit toward the branch conduits to allow through-flowline tools to pass therethrough in a curved path.

---

This invention is related to diverters used in branched conduits and more specifically to those used in underwater petroleum production operations.

In the production of petroleum from underground wells it is sometimes desirable for single conduits to branch into plural conduits. This is particularly true for tubing runs in underwater wells. It is often necessary to pump various through-flowline tools in and out of the tubing of a well. Access to the tubing string through the tubing run extension is required. It is also necessary to provide for ingress and egress between the tubing string and a flowline. These functions may be accomplished by what is commonly called a Y connection which offers a smooth transition free of obstructions through which various tools may easily pass. One conduit branch may communicate with a vertical tubing run extension and another may connect into a flowline. Means must be provided for directing passage through the particular branch desired while effectively blocking the other.

In the case of underwater wells, means for diverting passage through Y connections must be operable from a remote location. This is sometimes accomplished by inserting a deflection plug, which may be lowered on a wire line, to block passage in the tubing run extension. However, when it is desired to divert through-flowline tools into the tubing run extension, special tools are required to remove the deflection plug. Also, if it is desired to enter the well for servicing etc., the deflection plug must be removed. This involves extra time, expense and equipment. The invention as disclosed herein eliminates these problems.

Briefly stated the invention is a remote operated diverter valve. The valve is, basically, an enclosed cylindrical plug disposed in a Y conduit with a hydraulic operator attached thereto. The plug has passages therethrough which may be aligned, by axial movement of the plug with the particular conduit branch desired.

It is therefore, a primary object of this invention to provide a means for directing flow through any branch of a Y conduit while effectively blocking the other branches.

Another object of the invention is to provide a diverter capable of remote operation without the necessity of accessory tools.

Further objects of the invention will become apparent on the examination of the following description and drawings, in which:

FIGURE 1 is a schematic showing one embodiment of the invention connected to an underwater well;

FIGURE 2 is a section of the said embodiment of the invention taken along line 2—2 of FIGURE 3.

Figure 3:
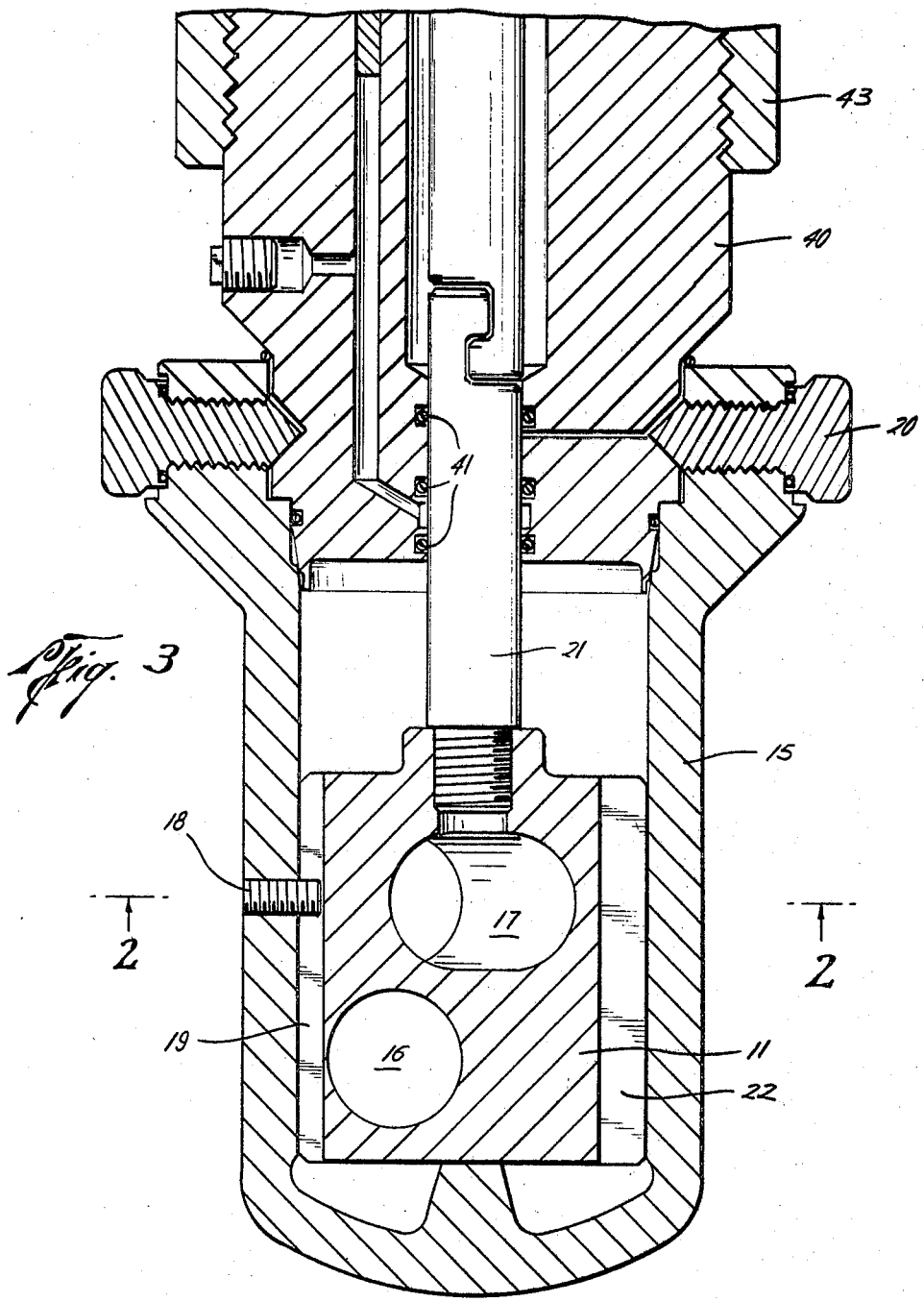
FIGURE 3 is a plan view, partially in section, of the said embodiment of the invention, shown with its operator.

Looking first at FIGURE 1, a tubing string 1 is shown rising from an underwater wellhead 2. A Y conduit connection 3 is shown branching into a tubing run extension 4 and a flowline 5. Master valve 6 is located between wellhead 2 and Y connection 3. Swab valve 7 is mounted vertically above Y 3. Wing valve 8 joins one branch of Y 3 and flowline 5. Disposed within Y 3 is a diverter valve 10 of the invention which is to be described. The diverter valve described is for a single tubing well. The valve may obviously be adapted for use in multiple tubing wells.

Referring now to FIGURES 2 and 3, diverter valve 10 will be explained in detail. A cylindrical plug 11 is disposed in the junction of a Y 3. Y 3 has a main conduit 12 and branch conduits 13 and 14. The axis of plug 11 is perpendicular to the axis of flow in each of the conduits. Plug 11 is enclosed within housing 15 which communicates with all conduits. Housing 15 is of such length as to allow plug 11 to move in an axial direction. Passages 16 and 17 pass through plug 11 at right angles to the plug axis. The axis of passages 16 is such that upon the proper axial movement of plug 11 passage 16 will serve as communication between main conduit 12 and branch conduit 13. On further movement of plug 11 passage 17 will serve as communication between main conduit 12 and branch conduit 14. Passages 16 and 17 are arranged at opposite ends of plug 11 so that while one is serving as communication between the aforementioned conduits the other is blocked at each end by housing 15. Therefore, it can be seen that while flow is maintained between main conduit 12 and one of the branch conduits, the other branch conduit is blocked by plug 11. Thus, materials may be passed between main conduit 12 and one of the branch conduits and effectively prevented from passing through the other conduit.

As is well known in the art, through-flowline tools are generally made up of several rigid sections or units connected by flexible couplings. This allows the tools to pass through conduits, which have a limited degree of curvature; e.g., a radius of twenty times the conduit diameter (approximately 3½ feet for 2-inch diameter). If the passages 16 and 17 of plug 11 had uniform cross-sectional areas equal to the area of conduits 13 and 14, through-flowline tools would become lodged in the plug, especially passage 17 since the radius of curvature would be less than the minimum permitting their passage. Therefore, passage 17 is formed with an increasing cross-sectional area from conduit 14 toward main conduit 12 which also has an enlarged cross-sectional area at plug 11 decreasing downwardly toward the wellhead. Even though the path from main conduit 12 to branch conduit 13 is a straight line it is necessary that passage 16 also be provided with an increased area toward main conduit 12, since to do otherwise would present a shoulder on plug 11 capable of halting movement of through-flowline tools which move through main conduit 12 toward conduit 13.

At times, the force of tools or other materials passing through plug 11 will tend to make plug 11 rotate within housing 15. To prevent this, a slot 19 is longitudinally machined on the exterior of plug 11 and a cooperating pin 18 is inserted through housing 15 so as to ride in slot 19. Pin 18 is welded in this position to housing 15.

Thus, plug 11 may move axially, pin 18 and slot 19 acting as a guide, but is prevented from rotating relative to housing 15.

To reduce hindrance of axial motion due to differential pressures and frictional drag, equalizing passage 22 is machined on plug 11 in the form of a slot. Thus, fluid may pass through the slot, maintaining relatively equal pressures throughout housing 15. This is also aided by leaving considerable clearance at 23 between plug 11 and the juncture of conduits 13 and 14 so that passages 16 and 17 and conduits 12, 13 and 14 are always at the same pressure. This prevents pressure locking of plug 11 due to differential pressures which might otherwise exist between conduits 12, 13 and 14. An alternative method of accomplishing this is to provide interconecting conduits between passages 16 and 17 within plug 11.

Stem 21 is connected to plug 11 and extends into operator connection 40 which is sealingly attached to the base of housing 15 by bolts 20. Operator connection 40 is equipped with packing glands 41 around stem 21. Stem 21 is attached to a hydraulic operator 43. Many operators are suitable for this function, and an operator resiliently biased in one direction is preferred. It will suffice to say that operator 43 imparts axial motion to plug 11 through stem 21. A pressurized fluid source is supplied to operator 43.

In operation, operator 43 would be biased so that plug 11 would be aligned with tubing run extension 4. This will assure that on failure of hydraulic power, vertical access to the well may be obtained through tubing run extension 4. To divert flow through flowline branch conduit 14, upon the proper signal, operator 43 would be activated through its pressure fluid source. Plug 11 would move to the position shown in FIGURES 2 and 3. Thus, materials would be free to pass between main conduit 12 and flowline branch 14. To return to its biased position of alignment with tubing run extension 4, the pressure to operator 43 would be relieved.

It may be appreciated that operation of operator 43 could be accomplished simultaneously with the operation of piston-operated valves such as wing valve 8 in FIGURE 1. Thus, existing controls may be utilized to perform this added function.

I claim:

1. A diverting device for directing material flow through a main conduit and branch conduits of a Y comprising:
   axially movable plug means;
   housing means at the confluence of said conduits enclosing said plug means, said housing means communicating with said conduits; and
   passage means through said plug means, said passage means being alignable with said main conduit and at least one of said branch conduits on selective axial positioning of said plug means;
   said passage means comprising at least one passage whose cross-sectional area increases from said branch conduit toward said main conduit.

2. The combination of claim 1; and pressure equalizing means interconnecting said main conduit and said branch conduit for maintaining them at substantially the same pressure regardless of the position of said plug means.

3. The combination of claim 2 in which said pressure equalizing means comprises an open fluid passageway through the walls of said branch conduits.

4. The combination of claim 2 in which said passage means comprises plural passages and said pressure equalizing means comprises conduit means interconnecting said plug passages within said plug.

5. A diverting device for directing materials through a main conduit and alternate branches of a Y conduit comprising:
   axially movable plug means at the confluence of said main and branch conduits;
   housing means enclosing said plug means, said housing means communicating with said main conduit and said branches;
   plural passage means through said plug means, each of said passage means being alignable on selective axial motion of said plug means to provide flow communication between said main conduit and one of said branches;
   means for imparting axial motion to said plug means to align said passage means; and
   pressure equalizing means between said main conduit and said branches maintaining them at substantially the same pressure regardless of the position of said plug means.

6. The diverting device of claim 5 wherein said passage means comprises at least two passages each of which have cross-sectional flow areas decreasing from said main conduit toward said branches.

7. A diverter for directing flow through the main conduit and diverse branches of a Y conduit comprising:
   cylindrical plug means at the juncture of said main conduit and diverse branches, said plug being axially movable for blocking passage between said main conduit and any one of said branches;
   a plurality of passages through said plug means each one of which is positionable on said plug axial motion to provide flow communication between said main conduit and one of said branches, the flow area of said passages adjacent said main conduit being greater than the flow area adjacent said branches,
   equalizing pressure means interconnecting said main conduit and said branches maintaining them at substantially the same pressure regardless of said plug position; and
   operable means for selectively positioning said cylindrical plug for allowing passage between said main conduit and one of said branches while blocking other branches.

8. The diverter according to claim 7 wherein said plug means is enclosed in a housing which communicates with said main conduit and said diverse branches; second equalizing pressure means communicating with both ends of said housing means for maintaining equal pressures on either end of said cylindrical plug means.

9. The diverter according to claim 7 wherein at least one of said branches flow axis is inclined from said main conduit flow axis, the flow area of said main conduit increasing toward said plug means cooperating with said passages to permit passage of tools which will not pass through a radius of less than about twenty times the diameter of a conduit whose flow area is substantially the same as the smallest flow area of said main and branch conduits.

10. Apparatus for diverting through-flowline tools at an underwater wellhead comprising:
   a Y connection at the upper end of a tubing string comprising a main conduit branching into a tubing run extension conduit and a flowline conduit;
   a cylindrical plug disposed at the junction of said main and branch conduits mounted for axial movement perpendicular to the flow axis of said conduits and enclosed within a housing;
   at least two passages through said plug at right angles to said plug axis, one of said passages being alignable with said main conduit and said tubing run extension branch conduit and another of said passages being alignable with said main conduit and said flowline branch conduit on selective motion of said plug, the flow area of said passages decreasing from said main conduit toward said branch conduits and the flow area of said main conduit increasing toward said plug to permit the passage of through-flowline tools from said main conduit into either said flowline branch or said extension branch on said selective motion of said plug; and fluid passage means interconnecting said branch conduits maintaining them at substantially the same pressure regardless of the position of said plug.

References Cited

UNITED STATES PATENTS

| | | | |
|---|---|---|---|
| 827,981 | 8/1906 | Klopfer | 251—325 X |
| 1,147,157 | 7/1915 | Foster | 251—325 X |
| 1,930,557 | 10/1933 | Hughes | 251—31 X |
| 2,534,477 | 12/1950 | Prout | 137—625.47 X |
| 2,988,873 | 6/1961 | Falberg | 251—325 X |

FOREIGN PATENTS 536,282  1/1957  Canada.

M. CARY NELSON, Primary Examiner

W. R. CLINE, Assistant Examiner